(12) United States Patent
Atiqullah et al.

(10) Patent No.: US 6,908,876 B2
(45) Date of Patent: Jun. 21, 2005

(54) SUPPORTED METALLOCENE CATALYST SYSTEM FOR OLEFIN POLYMERIZATION, METHOD FOR MAKING AND USING THE SAME

(75) Inventors: Muhammad Atiqullah, Dhahran (SA); Akhlaq Moman, Riyadh (SA); Muhammad Naseem Akhtar, Dhahran (SA); Atieh Abu-Raqabah, Riyadh (SA); Syriac J. Palackal, Riyadh (SA); Muhammad A. Al-Saleh, Dhahran (SA); Faizur Rahman, Dhahran (SA); Muhammad Ibrahim, Riyadh (SA); Javaid H. Khan, Dhahran (SA)

(73) Assignee: Saudi Basic Industries Corporation (SA)

( * ) Notice: Subject to any disclaimer, the term of this patent is extended or adjusted under 35 U.S.C. 154(b) by 70 days.

(21) Appl. No.: 10/414,615

(22) Filed: Apr. 16, 2003

(65) Prior Publication Data

US 2004/0209766 A1 Oct. 21, 2004

(51) Int. Cl.$^7$ .................................................. C08F 4/64
(52) U.S. Cl. ....................... 502/120; 502/113; 502/129; 502/131; 502/132; 502/152; 526/129; 526/160; 526/165; 526/943
(58) Field of Search ................................ 502/113, 120, 502/129, 131, 132, 152; 526/129, 160, 165, 943

(56) References Cited

U.S. PATENT DOCUMENTS

| | | | |
|---|---|---|---|
| 4,808,561 A | 2/1989 | Welborn | |
| 4,871,705 A | 10/1989 | Hoel | |
| 4,874,734 A | 10/1989 | Kioka et al. | |
| 5,206,199 A | 4/1993 | Kioka et al. | |
| 5,627,246 A | 5/1997 | Langhauser et al. | |
| 5,824,620 A | 10/1998 | Vega et al. | |
| 6,133,187 A | 10/2000 | Vega et al. | |
| 6,177,526 B1 | 1/2001 | Fritze | |
| 6,194,343 B1 | 2/2001 | Collins et al. | |
| 6,201,081 B1 | 3/2001 | Shamshoum et al. | |
| 6,225,251 B1 | 5/2001 | Shamshoum et al. | |
| 6,239,059 B1 | 5/2001 | Saudemont et al. | |
| 6,239,060 B1 | 5/2001 | Dockter et al. | |
| 6,486,936 B1 | 11/2002 | Sugimoto | |
| 6,506,866 B2 * | 1/2003 | Jacobsen et al. | 526/348 |
| 6,528,596 B2 * | 3/2003 | Takaoki et al. | 526/113 |

FOREIGN PATENT DOCUMENTS

| | | |
|---|---|---|
| EP | 206794 | 12/1986 |
| EP | 302424 | 2/1989 |
| EP | 354893 | 2/1990 |
| EP | 426646 | 5/1991 |
| EP | 757992 | 2/1997 |
| EP | 802203 | 10/1997 |
| WO | WO 200226842 | 10/2002 |

OTHER PUBLICATIONS

Giannetti et al., "Ethylene Polymerization by IVB Transition Metal Complexes/Methyl Aluminoxane Catalyst Systems", *Journal of Polymer Science: Polymer Chemistry Edition*, vol. 23, pp. 2117–2133 (1985).
Soga et al., "Activation of SiO$_2$–Supported Zirconocene Catalysts by Common Trialkylaluminiums", *Makromolecular Chemistry*, 194, pp. 3499–3504 (1993).
Harlan et al., "*tert*–Butylaluminum Hydroxides and Oxides: Structural Relationship between Alkylalumoxanes and Alumina Gels", *Organometallics*, 13, pp. 2957–2969 (1994).
Harlan et al., "Three–Coordinate Aluminum is Not a Prerequisite for Catalytic Activity in the Zirconocene—Alumoxane Polymerization of Ethylene", *Journal of the American Chemical Society*, 117, pp. 6465–6474 (1995).
Uozumi et al., "Copolymerization of Ethylene and 1–octene with Cp*TiCl$_3$ as Catalyst Supported on 3–aminopropyltrimethoxysilane treated SiO$_2$", *Macromolecular Rapid Communication*, 18, pp. 9–15 (1997).
Tait and Ediati, "Supported Metallocene Catalysts for Propene Polymerization", *Metalorganic Catalysts for Synthesis and Polymerisation*, pp. 307–320 (1999).
Przybyla et al., "Influence of the Particle Size of Silica Support on the Genetics and the Resulting Polymer Properties at the Polypropylene Polymerization with Heterogeneous Metallocene catalysts; Part I: Experimental Studies and Genetic Analysis", *Metalorganic Catalysts for Synthesis and Polymerisation*, pp. 321–332 (1999).
dos Santos et al., "Organosilicon–Modified Silicas as Support for Zirconocene Catalyst", *Journal of Molecular Catalysis*, 154, pp. 103–113 (2000).
Rytter et al., "Methylaluminoxane as a Cocatalyst for Olefin Polymerization. Structure, Reactivity and Cocatalytic Effect", *Organometallic Catalysts and Olefin Polymerization*, pp. 23–27 (2001).

* cited by examiner

*Primary Examiner*—Caixia Lu
(74) *Attorney, Agent, or Firm*—Kramer Levin Naftalis & Frankel LLP

(57) ABSTRACT

The present invention relates to a supported catalyst system for olefin polymerization which comprises at least one metallocene component and a support of an inorganic oxide of silica, aluminum or a polymer containing hydroxyl groups. The support is modified with an organogermane and/or organotin compound. The inventive catalyst system produces minimal reactor fouling, has excellent productivity and good hydrogen responsiveness. The present invention also relates to a process for preparing the catalyst system and to the slurry/suspension or gas-phase polymerization of olefins using the catalytic system, optionally with a small amount of aluminoxane cocatalyst.

20 Claims, No Drawings

SUPPORTED METALLOCENE CATALYST SYSTEM FOR OLEFIN POLYMERIZATION, METHOD FOR MAKING AND USING THE SAME

FIELD OF THE INVENTION

The present invention relates to a highly active supported metallocene catalyst system, and to the slurry/suspension or gas-phase polymerization of olefins using the same.

BACKGROUND

Homogeneous or non-supported metallocene catalysts, cocatalyzed by organoaluminum compounds (usually methylaluminoxane), are well known. They may be exploited for their high catalytic activity when used in olefin polymerization and for their ability to produce polymers with terminal unsaturation. However, these homogeneous catalyst systems have several disadvantages. They require very high cocatalyst (methylaluminoxane) to catalyst (metallocene) ratios and the polymers made with these catalysts are known to foul their reactors. Further, these catalysts do not offer desirable resin morphology and produce relatively large amounts of undesirable fines. All these disadvantages limit the commercial utility of homogeneous metallocene catalyst systems.

On the other hand, supported catalyst systems improve resin morphology and are effective with lower cocatalyst to catalyst ratios. However, the known supported systems are typified by low catalystic activity. A side effect of this low catalytic activity is unacceptable catalyst residue in resin produced with such systems. These residues cause processing problems and deteriorate the quality of the end products. The low catalytic activity of these supported catalysts systems has caused start-up problems for fluid-bed processes, and has resulted in unfavorable process economics. Moreover, the metallocene tends to leach off the support of previously known systems. Therefore, the synthesis of a supported metallocene/aluminoxane catalyst system that offers commercially acceptable levels of catalyst activity, desirable resin morphology, and which does not cause reactor fouling during polymerization has remained a challenge.

Prior attempts to make supported metallocene catalyst systems with high activity and which produce polyolefins having uniform particulate morphology and narrow particle size distribution, include the following: preactivate or precontact the metallocene and the organoaluminum cocatalyst (EP 302,424; EP 354,893); prepolymerize a heterogeneous catalyst system using at least one olefin (EP 426,646; U.S. Pat. No. 4,871,705); modify a dehydrated hydroxyl-containing inorganic support before loading the metallocene catalyst (WO 200226842); and conducting the polymerization using an aromatic solvent (U.S. Pat. No. 6,468,936). Another approach which has been used is to modify an inorganic support in such systems using: the methyl aluminoxane (MAO) cocatalyst (U.S. Pat. No. 4,808,561); organosilicon-containing compounds (U.S. Pat. Nos. 4,874,734; 5,206,199; 5,627,246; 6,194,343; 6,239,059; alumino-siloxane compounds (U.S. Pat. No. 5,206,199), and a mixture of borax and methanol (U.S. Pat. No. 6,239,060).

The prior attempts to make an improved supported metallocene catalyst have not been entirely successful in that they have resulted in polymer products having irregular and broad particle size distribution and poor resin morphology. Others have produced better resin morphology; but have achieved lower than desirable catalyst activity. Although the aromatic hydrocarbon solvents such as benzene, toluene, and substituted benzene were found to increase the activity of supported metallocene catalyst systems, the use of these solvents has caused metallocene leaching and dissolution. Accordingly, the prior art approaches to supported metallocene catalysts systems have suffered from one or more of the following deficiencies: low catalyst activity, unacceptable levels of reactor fouling during polymerization, the production of polymers having fines and/or broad molecular weight distributions.

The present invention applies a novel approach to decrease the steric hindrance and prevent bimetallic deactivation in supported metallocene catalyst systems through the use of organogermane and/or organotin support modifiers. It also solves the problems of low catalyst activity and unacceptable levels of reactor fouling during polymerization. Further, it achieves these results using inexpensive and simple-structured metallocenes and only small amounts of aluminoxane cocatalyst. The catalyst system of the present invention demonstrates good hydrogen responsiveness, particularly using a very small amount of hydrogen. The high activity of the present catalyst system enables efficient fluid-bed polymerization and the low cocatalyst to catalyst ratios which are possible with the invention result in polymers having minimal contamination.

DETAILED DESCRIPTION OF THE INVENTION

The present inventive catalyst system comprises at least one metallocene component, with or without a cocatalyst component, and at least one support comprised of an inorganic oxide of silicon or aluminum, or of a polymer containing hydroxyl groups, or mixtures thereof, wherein the support is modified with organogermane and/or organotin compounds.

Metallocenes suitable for use in the invention can be represented by the general formula $Cp_1R_mMR^1{}_nX_o$ wherein Cp is an unsubstituted or substituted and/or fused cyclopentadienyl group, R is a group of 1–4 atoms connecting at two Cp groups, M is a transition metal selected from Group IVB or VB of the periodic Table of the Elements, $R^1$ is a hydrocarbyl radical containing 1 to 20 carbon atoms, for example, methyl, ethyl or propyl, and X is a halogen atom or a hydrocarbyl group, wherein 1=2–3, m=0 or 1, n=0–3, o=0–3, and the sum 1+m+n+o equals the oxidation state of M.

The cyclopentadienyl ring(s), Cp, may be substituted with a hydrocarbyl radical containing 1 to 20 carbon atoms; such as methyl, ethyl, propyl, butyl, dodecyl, aryl, isoamyl, isobutyl or phenyl. The preferred transition metals, M, are titanium, zirconium, vanadium or hafnium, particularly zirconium.

The non-limiting examples of metallocene compounds, M, which are useful in the invention: include bis(cyclopentadienyl)zirconium dimethyl, bis(cyclopentadienyl)zirconium methyl chloride, bis(cyclopentadienyl)zirconium ethyl chloride, bis(cyclopentadienyl)zirconium dichloride, bis(n-butylcyclopentadienyl)zirconium dichloride, bis(n-dodecylcyclopentadienyl)zirconium dichloride, ethylene-bis(tetrahydroindenyl)zirconium dichloride, ethylene-bis(tetrahydroindenyl)zirconium dimethyl, ethylene-bis(indenyl)zirconium dichloride, ethylene-bis(indenyl)zirconium dimethyl, dimethylsilanylene-bis(tetrahydroindenyl)zirconium dichloride and dimethylsilanylene-bis(tetrahydroindenyl)zirconium dimethyl, dimethylsilanylene-bis(indenyl)zirconium dichloride, and dimethylsilanylene-bis(indenyl)zirconium dimethyl.

The most preferred metallocene M is bis(n-butylcyclopentadienyl)zirconium dichloride.

The catalyst system of the invention preferably further comprises at least one cocatalyst. The cocatalyst component comprises at least one aluminoxane compound or a Lewis acid or ionic compound which can convert a metallocene-type catalyst to catalytically active metallocene-type cation. The preferred aluminoxane of the invention have the formula $(R'AlO)_q$. Aluminoxanes can be linear as in formula I or cyclic as in formula II or of the cluster type as in formula III, as illustrated below.

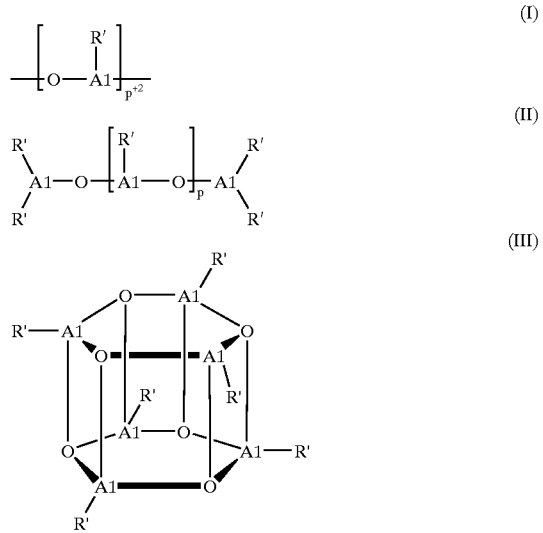

The radicals R' in the above formulas can be identical or different and each can be a $C_1$–$C_{20}$ hydrocarbon group, including $C_1$–$C_6$ alkyl groups, $C_6$–$C_{18}$ aryl groups, benzyl or hydrogen, and p is an integer from 2 to 50, preferably from 10 to 35.

Preferably, the radicals R' are identical and are methyl, isobutyl, n-butyl, phenyl or benzyl, most preferably methyl. The most preferred aluminoxane cocatalyst to be loaded on the support is the structurally modified methylaluminoxane which is synthesized by completely evaporating the solvent from the cocatalyst compound under very high vacuum.

According to the invention, the expression modified methylaluminoxane (SM-MAO) describes a cocatalyst which has been made as describe above.

If the radicals R' are different, they are preferably methyl and hydrogen, methyl and isobutyl or methyl and n-butyl, with hydrogen, isobutyl or n-butyl preferably being present in an amount up to 0.01–40% of the number of radicals R'.

As Lewis acid, preference is given to using at least one organoboron or organoaluminum compound containing $C_1$–$C_{20}$ groups, such as branched or unbranched alkyl or haloalkyl, for example, methyl, propyl, isopropyl, isobutyl or trifluoromethyl, or unsaturated groups, such as aryl or haloaryl, for example, phenyl, tolyl, benzyl, p-fluorophenyl, 3,5-difluorophenyl, pentachlorophenyl, pentafluorophenyl, 3,4,5-trifluorophenyl or 3,5-di(trifluoromethyl)phenyl.

Particular preference is given to organoboron compounds. Examples of organoboron compounds are trifluoroborane, triphenylborane, tris(4-fluorophenyl)borane, tris(3,5-difluorophenyl)borane, tris(4-fluoromethylphenyl)borane, tris(3,4,5-trifluoropbenyl)borane, tris(pentafluorophenyl)borane, tris(tolyl)borane, tris(3,5-dimethylphenyl)borane, and/or tris(3,4,5-trifluorophenyl)borane. The most preferred organoboron compound is tris(pentafluorophenyl)borane.

Preferred ionic cocatalysts of the invention are compounds which contain a non-coordinating coordinating anion such as tris(pentafluorophenyl)borates, tetraphenylborates, $SbF_6^-$, $CF_3SO_3^-$ or $ClO_4^-$.

As cationic counterion, use is made of Lewis bases such as methyl amine, aniline, dimethylamine, diethylamine, N-methylanilin, diphenylamine, N,N-dimethylaniline, trimethylamine, triethylamine, tri-n-butylamine, methyldiphenylamine, pyridine, p-bromo-N,N-dimethylaniline, p-nitro-N,N-dimethylaniline, triphenylphosphine, triethylphosphine, diphenylphosphine, tetrahydrothiophene, and triphenylcarbenium.

Examples of the ionic compounds which are useful in the invention are the following: triethylammonium tetra(phenyl)borate, tributylammonium tetra(phenyl)borate, trimethylammonium tetra(tolyl)borate, tributylammonium tetra(tolyl) borate, tributylammonium tetra(pentafluorophenyl)borate, tributylammonium tetra(pentafluorophenyl)aluminate, tripropylammonium tetra(dimethylphenyl)borate, tributylammonium tetra(trifluoromethylphenyl)borate, tributylammonium tetra(4-fluorophenyl)borate, N,N-dimethylanilinium tetra(phenyl)borate, N,N-diethylanilinium tetra(phenyl)borate, N,N-dimethylanilinium tetrakis(pentafluorophenyl)borate, N,N-dimethylanilinium tetrakis(pentafluorophenyl)aluminate, di(propyl)ammonium tetrakis(pentafluorophenyl)borate, di(cyclohexyl)ammonium tetrakis(pentafluorophenyl) borate, triphenylphosphonium tetrakis(phenyl)borate, triethylphosphonium tetrakis(phenyl)borate, diphenylphosphonium tetrakis(phenyl)borate, tri(methylphenyl) phosphonium tetrakis(phenyl)borate, tri(dimethylphenyl) phosphonium tetrakis(phenyl)borate, triphenylcarbenium tetrakis(pentafluorophenyl)borate, triphenylcarbenium tetrakis(pentafluorophenyl)aluminate, triphenylcarbenium tetrakis(phenyl)aluminate, ferrocenium tetrakis (pentafluorophenyl)borate, and/or ferrocenium tetrakis (pentafluorophenyl)aluminate.

Preference is given to triphenylcarbenium tetrakis (pentafluorophenyl)borate and/or N,N-dimethylanilinium tetrakis(pentafluorophenyl)borate.

It is also possible to use mixtures of at least one Lewis acid and at least one ionic compound. Likewise of importance as cocatalyst components are borane or carborane compounds such as 7,8-dicarbaundecarborane, undecahydrido-7,8-dimethyl-7,8-dicarbaundecarborane, dodecahydrido-1-phenyl-1,3-dicarbaundecarborane, tri (butyl)ammonium undecahydrido-8-ethyl-7,9-dicarbaundecarborate, 4-carbanonaborane, bis(tri(butyl) ammonium)nonaborate, bis(tri(butyl)ammonium) undecaborate, bis(tri(butyl)ammonium)dodecaborate, bis(tri (butyl)ammonium) decachlorodecarborate.

The support component of the catalyst system of the invention is a modified organic or inorganic support. Preference is given to supports made by reacting at least one inorganic oxide having reactive groups, such as OH groups on its surface, with organogermane and/or organotin compounds illustrated below by Formulas IV and V below.

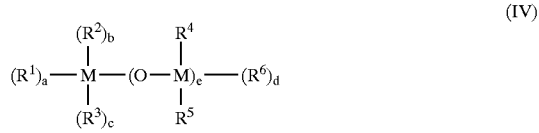

(IV)

wherein $R^1$, $R^2$, $R^3$, $R^4$, $R^5$ & $R^6$ are identical or different and are each a $C_1$–$C_{30}$-group, such as $C_1$–$C_{20}$-alkyl group, a $C_2$–$C_{20}$-alkenyl group, a $C_2$–$C_{20}$-alkynyl group, a $C_5$–$C_{30}$-aryl group, a $C_5$–$C_{30}$ arylalkyl group, a $C_5$–$C_{30}$-arylalkenyl group, a $C_5$–$C_{30}$-arylalkynyl group a $C_5$–$C_{30}$-alkylaryl group, a $C_1$–$C_{20}$-alkyloxy group, a $C_1$–$C_{20}$-alkenyloxy group, a $C_5$–$C_{30}$-aryloxy, a $C_1$–$C_{20}$-alkoxyalkyl group, a $C_5$–$C_{30}$-alkylaryloxy group, a $C_5$–$C_{30}$-arylalkyloxy group, a $C_5$–$C_{30}$-alkyloxyaryl group, a $C_5$–$C_{30}$-aryloxyalkyl group, a halogen atom, a hydroxyl group, or a hydrogen atom and at least one of $R^1$, $R^2$, $R^3$, $R^4$, $R^5$ and $R^6$ is a radicpal comprising an amino-, phosphino, thiol- or halogen containing group such as amino group, $C_1$–$C_{20}$-alkylamino group, $C_1$–$C_{20}$-alkylaminoalkyl group, a $C_5$–$C_{30}$-arylamino group, a $C_5$–$C_{30}$-alkylaminoaryl group, a $C_5$–$C_{30}$-alkylarylamino group, a $C_5$–$C_{30}$-arylaminoalkyl group, a $C_5$–$C_{30}$-arylalkylamino group, a $C_1$–$C_{20}$-alkenylamino group, phosphino group, $C_1$–$C_{20}$-alkylphosphino group, $C_1$–$C_{20}$-alkylphosphinoalkyl group, a $C_5$–$C_{30}$-arylphosphino group, a $C_5$–$C_{30}$-alkylphosphinoaryl group, a $C_5$–$C_{30}$-arylphosphinoalkyl group, a $C_5$–$C_{30}$-alkylarylphosphino group, a $C_5$–$C_{30}$-arylalkylphosphino group, a $C_1$–$C_{20}$-alkenylphosphino group, -thiol group, $C_1$–$C_{20}$-alkylthiol group, $C_1$–$C_{20}$-alkylthiolalkyl group, a $C_5$–$C_{30}$-arylthiol group, a $C_5$–$C_{30}$-alkylthiolaryl group, a $C_5$–$C_{30}$-arylthiolalkyl group, a $C_5$–$C_{30}$-alkylarylthiol group, a $C_5$–$C_{30}$-arylalkylthiol group, a $C_1$–$C_{20}$-alkenylthiol group, a halogen atom, $C_1$–$C_{20}$-haloalkyl group, a $C_5$–$C_{30}$-haloaryl group, a $C_1$–$C_{20}$-haloalkenyl group, whereas $R^1$, $R^2$, $R^3$, $R^4$, $R^5$ and $R^6$ can bridge two organo M units; and M=Ge or Sn a, b, c, d are 0, 1, 2, 3, or 4 a+b+c+d=4 e=0–10 and

$R^1_x A(OBR^2_y)_2$ (V)

wherein $R^1$ and $R^2$ are, independent of one another, identical or different, and are each a $C_1$–$C_{30}$-group, such as $C_1$–$C_{20}$-alkyl group, a $C_2$–$C_{20}$-alkenyl group, a $C_2$–$C_{20}$-alkynyl group, a $C_5$–$C_{30}$-aryl group, a $C_5$–$C_{30}$ arylalkyl group, a $C_5$–$C_{30}$-arylalkenyl group, a $C_5$–$C_{30}$-arylalkynyl group a $C_5$–$C_{30}$-alkylaryl group, a $C_1$–$C_{20}$-alkyloxy group, a $C_1$–$C_{20}$-alkenyloxy group, a $C_5$–$C_{30}$-aryloxy, a $C_1$–$C_{20}$-alkoxyalkyl group, a $C_5$–$C_{30}$-alkylaryloxy group, a $C_5$–$C_{30}$-arylalkyloxy group, a $C_5$–$C_{30}$-alkyloxyaryl group, a $C_5$–$C_{30}$-aryloxyalkyl group, a halogen atom, a hydroxyl group, or a hydrogen atom; and A=Al, Ge, Zr, Sn or Hf B=Si, Ge or Ti y=3 x or z=0, 1, 2, 3, and 4 x+z=4 for Ge, Zr, Sn and Hf x+z=3 for Al

The inorganic oxide can be, for example, $SiO_2$, $Al_2O_3$, MgO, $ZrO_2$, and $TiO_2$. Particular preference is given to silicon oxide and/or aluminum oxide. The preferred support has a specific surface area in the range from 10 to 1000 m²/g, more preferably from 150 to 500 m²/g, and most preferably from 200 to 500 m²/g. The pore volume of the preferred support is from 0.5 to 4.0 ml/g, more preferably from 1.0 to 3.5 ml/g, most preferably from 1.2 to 3 ml/g.

Reacting the supports of the invention with the referenced organogermane and/or organotin compounds modifies the reactive groups on the surface of the support, preferably with OH groups. This passivates the OH groups (isolated, geminal, and hydrogen-bonded) and thereby reducing steric hindrance, and serves as a spacer unit, preventing bimolecular reactions that deactivate the catalyst. Catalyst activity has been found to increase greatly.

The support of the invention is dried at from 100° C. to 800° C. in a stream of inert gas for 1 to 24 hours, preferably at 250° C. for 4 hours.

The non-limiting examples of the organogermane and/or organotin compounds of the invention represented by Formulas IV and V are the following: methyltrichloro germane, dimethyldichloro germane, trimethylchloro germane, ethyltrichloro germane, diethyldichloro germane, triethylchloro germane, butyltrichloro germane, allyl trichloro germane, tetramethoxy germane, tetrakis(siloxy)trimethyl germanium, tetrakis(siloxy)triethyl germanium, tetrakis (siloxy)trimethyl zirconium, tetrakis(siloxy)trimethyl germanium and the organotin analogues of the foregoing compound. The most preferred one is methyltrichloro germane.

According to one embodiment of catalyst preparation, the dehydroxylated support is first slurried with a requisite amount of dry organic solvent such as pentane, heptane, dichloromethane or toluene under continuous magnetic stirring in presence of argon. The most preferred solvent is toluene. An amount of organogermane and/or organotin compound(s), determined or described below, is then injected into the support-toluene slurry. The amount of organogermane and/or organotine compound added is preferably equimolar to a number of reactive groups on the surface of the support. The resulting mixture is refluxed preferably at from 40° C. to 150° C. for 3 to 36 hours, and more preferably at 130° C. for 24 hours. The final solid product is filtered, washed several times with an organic solvent, then dried for several hours under high vacuum.

The expression modified support as used herein references a support which has been treated as above.

By way of non-limiting example, a modified support is further processed by adding the modified support, for example, dehydroxylated silica, to a 250 ml catalyst synthesis glass reactor equipped with a mechanical stirrer. The modified support is slurried by adding adequate amount of a suitable dry organic solvent to it. MAO or SM-MAO is slowly added to the above slurry at 0 to 80° C. and is continuously stirred for 10 minutes to 2 hours. The resulting solid product is filtered and washed several times with toluene and added to the reactor. A given amount of the desired metallocene is separately taken into a Schlenk flask and is dissolved in a suitable dry organic solvent. This metallocene solution is injected into the reactor at 0 to 80° C. and is stirred continuously for 10 minutes to 2 h. The final supported catalyst is filtered, washed several times with a suitable organic solvent, then dried under high vacuum.

The present invention also provides a process for preparing a polyolefin by polymerizing one or more olefins in presence of the catalyst system of the invention comprising at least one modified support. The term polymerization refers to both homopolymerization and copolymerization.

Preference is given to polymerization of olefins of the formula $R^7$—CH=CH—$R^8$ where $R^7$ and $R^8$ are identical or different and are each a hydrogen atom or a carbon-containing radical having from 1 to 20 carbon atoms, and $R^7$ and $R^8$ together with the atoms connecting them can form one or more rings. Examples of such olefins are 1-olefins having from 2 to 40, preferably from 2 to 10, carbon atoms, for example, ethylene, propene, 1-butene, 1-pentene, 1-hexene, 4-methyl-1-pentene or 1-octene, styrene, dienes such as 1,3-butadiene, 1,4-hexadiene, vinylnorbornene or norbornadiene and cyclic olefins such as norbornene, tetracyclododecene or methylnorbornene. In the process of the invention, preference is given to homopolymerizing ethylene or propylene, or copolymerizing ethylene with one or more 1-olefins having from 3 to 20 carbon atoms, for example, propylene, and/or one or more dienes having from 4 to 20 carbon atoms, for example, 1,4-butadiene or norbornadiene. Examples of such copolymers are ethylene/propylene copolymers and ethylene/propylene/1,4-hexadiene copolymers.

The polymerization is preferably carried out at a temperature of from 25 to 250° C., particularly preferably from 50 to 200° C. The pressure is preferably from 1 to 200 bar, particularly preferably from 5 to 64 bar. The polymerization time is from 20 minutes to 10 hours preferably from 30 minutes to 120 minutes. The polymerization can be carried out in solution, in bulk, in suspension or in the gas phase, continuously or batchwise, in one or more stages.

The catalyst system used in the process of the present invention preferably comprises at least one metallocene component. It is also possible to use mixtures of two or more transition metal compounds of the metallocene component, for example, for preparing polyolefins having broad or multimodal molecular weight distribution and reactor blends.

A prepolymerization can be done using the catalyst system of the present invention. For the prepolymerization, preference is given to using the (or one of the) olefins used in the polymerization.

The supported catalyst system can be resuspended as powder or, while still moist, with solvent in an inert suspension medium. The suspension can be introduced into the polymerization system.

Before introducing the supported catalyst system of the invention into the polymerization system, it is advantageous to remove the adventitious poisons in the polymerization mixture by using an alkyl aluminum compound, such as trimethyl aluminum, triethyl aluminum, isoprenyl aluminum or aluminoxanes, or alkyl and aryl compounds of boron. As molecular weight regulator, hydrogen is added if required.

If the polymerization is carried out as a suspension or solution polymerization, an inert solvent customary for the low-pressure process is used. The polymerization is carried out, for example, in an aliphatic or cycloaliphatic hydrocarbon. Examples for such hydrocarbons are propane, butane, hexane, heptane, isooctane, cyclohexane and methyl cyclohexane.

The polymers prepared by the process of this invention are suitable, in particular, for producing shaped articles such as films, sheets or moulded articles.

The catalyst system of the invention achieves a catalyst activity of from 200 to 5,252 kg PE/(mol Zr. hr. bar) and a productivity of at least from 0.05 to 4.75 kg PE/(g cat. hr.) at a molar ratio of Al:Zr≦1,000. The polymers of the invention have melting points from 120.0° C. to 136.0° C.

The following examples illustrate the invention.

EXAMPLES

The examples are divided into two classes—examples on catalyst synthesis and examples on olefin homo- and copolymerization (that evaluate the performance of the synthesized catalysts).

General Procedure

All the manipulations were done under an inert atmosphere of argon using Schlenk technique and glove box. The solvents used were dried using 4A type molecular sieve.

Examples on Catalysis Synthesis

Example C 1 (Reference Catalyst)

This example illustrates the preparation of the reference supported catalyst. Here, first silica with a controlled amount of hydroxyl group was prepared by dehydroxylation. The resulting silica was next used to sequentially load the as-received MAO (10 wt % in toluene) obtained from Crompton, Germany, and $Cp_2ZrCl_2$.

A given sample of silica PQ 3030 was placed in a quartz glass tube and was fluidized by feeding argon from the bottom of the tube. This glass tube was placed inside a Thermocraft furnace and was heated to 250° C. for 4 hours at a rate of 10° C./min, and then cooled. The dehydroxylated silica was transferred to a Schlenk flask under a continuous flow of argon. It was then stored in an inert atmosphere glove box for subsequent use.

The above dehydroxylated silica (9.9700 g) was taken in a 250 ml catalyst synthesis glass reactor equipped with a mechanical stirrer. The dehydroxylated silica was slurried by adding 61.0 ml of dry toluene to it. The as-received MAO (14.7 ml) was slowly added to the above slurry at room temperature and was continuously stirred for 30 min. The resulting solid product was filtered and washed thrice with 60 ml of toluene. $Cp_2ZrCl_2$ (0.2000 g) was separately added to Schlenk flask and was dissolved in 50.0 ml of dry toluene. This $Cp_2ZrCl_2$ solution was injected into the reactor and was stirred continuously with the MAO loaded support for 30 minutes. The final supported catalyst was filtered, washed thrice with 60.0 ml of toluene, thrice with 50.0 ml of n-pentane and dried for several hours under high vacuum.

This catalyst was designated as Catalyst C 1. It was stored in an inert glove box. The analysis of this catalyst showed an elemental loading of 0.46 wt % Zr and 4.00 wt % Al.

Example C 2 (Reference Catalyst)

This example illustrates the synthesis of a supported catalyst by sequentially loading the structurally modified MAO and $Cp_2ZrCl_2$ on the dehydroxylated silica of Example C 1. What follows first describes how the as-received MAO was structurally modified. This modified MAO is defined to be the SM-MAO.

The as-received MAO (40.0 ml) was taken in a 100 ml Schlenk flask and was evaporated to complete dryness using high vacuum. A white crystalline solid material (SM-MAO) was obtained. The high vacuum evaporation entirely removed toluene and the minor amount of free trimethylaluminum (TMA) and other low molecular weight fractions associated with the as-received MAO. The SM-MAO was stored in an inert atmosphere glove box.

The synthesis procedure essentially matches that of the reference catalyst (Example C 1). However, the used quantities of the support, toluene, SM-MAO, and $Cp_2ZrCl_2$ differed. In this example, 2.9800 g of the dehydroxylated silica was slurried with 20.0 ml of dry toluene; 0.4400 g of SM-MAO was dissolved in 4.4 ml of dry toluene; 0.0600 g of $Cp_2ZrCl_2$ was dissolved in 14.9 ml of dry toluene. The resulting catalyst was designated as Catalyst C 2. The analysis of this catalyst showed an elemental loading of 0.65 wt % Zr and 3.70 wt % Al.

Example C 3

This example comprises the chemical modification of the dehydroxylated silica PQ 3030 of Example 1 using n-butyltrichlorogermane ("BuGeCl$_3$) and its subsequent use in the synthesis of the catalyst by sequentially loading the as-received MAO and Cp$_2$ZrCl$_2$. The silica dehydroxylated of Example C 1 (5.0000 g) was placed in a 250 ml Schlenk flask under argon. Then it was slurried with 50.0 ml of dry toluene under continuous magnetic stirring; 2.6400 g of n-butyltrichlorogermane ("BuGeCl$_3$) was injected into the silica-toluene slurry. The resulting mixture was refluxed at 130° C. for 24 hours. The final solid product was filtered, washed thrice with 30.0 ml of toluene, thrice with 20.0 ml of n-pentane, and dried for several hours under high vacuum. The germanium content of the chemically modified silica was 4.40 wt %.

Next, 2.2900 g of the above modified silica was reacted with 3.4 ml of MAO and 0.0920 g of CP$_2$ZrCl$_2$ (in 11.4 ml of toluene) as described in Example C1. This catalyst was designated as Catalyst C 3. It was stored in an inert atmosphere glove box. The analysis of this catalyst showed an elemental loading of 0.56 wt % of Zr, 5.00 wt % Al, and 3.20 wt % Ge.

Example C 4

This example illustrates the synthesis of the catalyst by sequentially loading the SM-MAO of Example C 2 and Cp$_2$ZrCl$_2$ on the chemically modified silica of Example C 3. In this example, 2.0400 g of silica modified with n-butyltrichlorogermane ("BuGeCl$_3$) (Example C 3) was reacted with 0.60 g of SM-MAO (in 6.0 ml toluene) and 0.0820 g of Cp$_2$ZrCl$_2$ (in 10.2 ml toluene) following the procedure Example C 1. This catalyst was designated as Catalyst C 4. It was stored in an inert atmosphere glove box. The analysis of this catalyst showed an elemental loading of 0.46 wt % of Zr, 8.20 wt % of Al, and 3.10 wt % Ge.

Example C 5

This example comprises the chemical modification of the dehydroxylated silica PQ 3030 of Example C 1 using allyltrichlorogermane (allylGeCl$_3$) and its subsequent application in the synthesis of the catalyst by sequentially loading the as-received MAO and Cp$_2$ZrCl$_2$.

The above dehydroxylated silica (4.9700 g) was modified using 2.9300 g allyltrichlorogermane (allylGeCl$_3$) following the procedure of Example C 3. The germanium content of the chemically modified support was 5.80 wt %.

In this example, 2.0000 g of the above modified silica was reacted with 2.9 ml of MAO and 0.0800 g of Cp$_2$ZrCl$_2$ (in 20.0 ml of toluene). This catalyst was designated as Catalyst C 5. It was stored in an inert atmosphere glove box. The analysis of this catalyst showed a loading of 0.17 wt % of Zr, 4.10 wt % of Al and 4.70 wt % Ge.

Example C 6

This example illustrates the synthesis of the catalyst by sequentially loading the SM-MAO of Example C 2 and Cp$_2$ZrCl$_2$ on the chemically modified silica of Example C 5.

The synthesis procedure essentially matches that of Example C 4. However, the used quantities of the modified support, toluene, SM-MAO, and CP$_2$ZrCl$_2$ differed. In this example, 2.0000 g of the modified support was reacted with 0.5900 g of SM-MAO (in 6.0 ml toluene) and 0.0800 g of Cp$_2$ZrCl$_2$ (in 10.0 ml toluene). This catalyst was designated as Catalyst C 6. It was stored in an inert atmosphere glove box. The analysis of this catalyst showed an elemental loading of 0.51 wt % Zr, 0.70 wt % Al, and 5.60 wt % Ge.

Example C 7

This example illustrates the synthesis of the catalyst by sequentially loading the SM-MAO of Example C 2 and Cp$_2$ZrCl$_2$ on the dehydroxylated silica of Example C 1 chemically modified using tetrakis(trimethylsiloxy)germane.

The above silica (3.5300 g) was modified using 2.5000 g of tetrakis(trimethylsiloxy)germane following the procedure of Example C 3. The germanium content of the chemically modified support was 0.42 wt %.

The synthesis procedure essentially matches that of Example C 4. However, the used quantities of the support, toluene, SM-MAO, and CP$_2$ZrCl$_2$ differed. In this example, 1.9900 g of silica modified with tetrakis(trimethylsiloxy)germane was reacted with 0.5900 g of SM-MAO (in 6.0 ml toluene) and 0.0800 g of Cp$_2$ZrCl$_2$ (in 10.0 ml toluene). This catalyst was designated as Catalyst C 7. It was stored in an inert atmosphere glove box. The analysis of this catalyst showed an elemental loading of 1.00 wt % of Zr, 6.10 wt % of Al and 0.35 wt % of Ge.

Example C 8

This example illustrates the synthesis of the catalyst by sequentially loading the SM-MAO of Example C 2 and Cp$_2$ZrCl$_2$ on the dehydroxylated silica of Example C 1 chemically modified using methyltrichlorogermane (MeGeCl$_3$).

The above silica (4.9800 g) was modified using 2.5300 g of methyltrichlorogermane (MeGeCl$_3$) following the procedure of Example C 3. The germanium content of the chemically modified support was 5.50 wt %.

The synthesis procedure essentially matches that of Example C 4. However, the used quantities of the support, toluene, SM-MAO, and Cp$_2$ZrCl$_2$ differed. In this example, 1.9900 g of silica modified with methyltrichlorogermane (MeGeCl$_3$) was reacted with 0.6000 g of SM-MAO (in 6.0 ml toluene) and 0.0820 g of Cp$_2$ZrCl$_2$ (in 10.3 ml toluene). This catalyst was designated as Catalyst C 8. It was stored in an inert atmosphere glove box. The analysis of this catalyst showed an elemental loading of 0.91 wt % of Zr, 5.00 wt % of Al and 5.10 wt % of Ge.

Example C 9

This example illustrates the synthesis of the catalyst by sequentially loading the SM-MAO of Example C 2 and Cp$_2$ZrCl$_2$ on the dehydroxylated silica of Example C 1 chemically modified using n-butyltrichlorotin ("BuSnCl$_3$).

The above silica (4.9900 g) was modified using 3.4700 g of n-butyltrichlorotin ("BuSnCl$_3$) following the procedure of Example C 3. The tin content of the chemically modified support was 3.60 wt %.

The synthesis procedure essentially matches that of Example C 4. However, the used quantities of the modified support, toluene, SM-MAO, and Cp$_2$ZrCl$_2$ differed. In this example, 2.9600 g of silica modified with n-butyltrichlorotin (n-BuSnCl$_3$) was reacted with 0.8700 g of SM-MAO (in 8.7 ml toluene) and 0.1190 g of Cp$_2$ZrCl$_2$ (in 14.8 ml toluene). This catalyst was designated as Catalyst C 9. It was stored in an inert atmosphere glove box. The analysis of this catalyst showed a loading of 0.84% of Zr, 7.20% of Al and 1.30% of Sn.

Example C 10

This example illustrates the synthesis of the catalyst by sequentially loading the SM-MAO of Example C 2 and (n-Dodecyl-Cp)$_2$ZrCl$_2$ on the dehydroxylated silica of Example C 1 chemically modified using methyltricholorogermane (MeGeCl$_3$).

The above silica (7.5000 g) was modified using 1.9000 g of methyltricholorogermane (MeGeCl$_3$) following the procedure of Example C 3. The germanium content of the chemically modified support was 5.30 wt %.

The synthesis procedure essentially matches that of Example C 4. However, the used quantities of the modified support, toluene, SM-MAO, and (n-Dodecyl-Cp)$_2$ZrCl$_2$ differed. In this example, 2.5000 g of silica modified with methyltricholorogermane (MeGeCl$_3$) was reacted with 0.7400 g of SM-MAO (in 7.4 ml toluene) and 0.1000 g of (n-Dodecyl-Cp)$_2$ZrCl$_2$) (in 12.5 ml toluene). This catalyst was designated as Catalyst C 10. It was stored in an inert atmosphere glove box. The analysis of this catalyst showed a loading of 0.38 wt % of Zr, 4.70 wt % of Al and 4.50 wt % of Ge.

Example C 11

This example illustrates the synthesis of the catalyst by sequentially loading the SM-MAO of Example C 2 and (n-BuCp)$_2$ZrCl$_2$ on the dehydroxylated silica of Example C 1 chemically modified using methyltricholorogermane (MeGeCl$_3$).

The synthesis procedure essentially matches that of Example C 4. However, the used quantities of the modified support, toluene, SM-MAO, and (n-BuCp)$_2$ZrCl$_2$ differed. In this example, 2.9800 g of silica modified with methyltricholorogermane (MeGeCl$_3$) was reacted with 0.8780 g of SM-MAO (in 8.8 ml toluene) and 0.0895 g of (n-BuCp)$_2$ZrCl$_2$) (in 11.2 ml toluene). This catalyst was designated as Catalyst C 11. It was stored in an inert atmosphere glove box. The analysis of this catalyst showed a loading of 0.69 wt % of Zr, 7.30 wt % of Al and 4.10 wt % of Ge.

Example C 12

This example illustrates the synthesis of the catalyst by sequentially loading the SM-MAO of Example C 2 and (n-Dodecyl-Cp)$_2$ZrCl$_2$ on silica ES 70 from Crosfield (dehydroxylated at 250° C. for 4 hours) chemically modified using methyltricholorogermane (MeGeCl$_3$).

The above silica (9.9600 g) was modified using 2.7880 g of methyltricholorogermane (MeGeCl$_3$) following the procedure of Example C 3. The germanium content of the chemically modified support was 5.10 wt %.

The synthesis procedure essentially matches that of Example C 4. However, the used quantities of the modified support, toluene, SM-MAO, and (n-Dodecyl-Cp)$_2$ZrCl$_2$ differed. In this example, 3.2500 g of silica modified with methyltricholorogermane (MeGeCl$_3$) was reacted with 0.9550 g of SM-MAO (in 9.67 ml toluene) and 0.2110 g of (n-Dodecyl-Cp)$_2$ZrCl$_2$) (in 13.2 ml toluene). This catalyst was designated as Catalyst C 12. It was stored in an inert atmosphere glove box. The analysis of this catalyst showed a loading of 0.55 wt % of Zr, 4.60 wt % of Al and 4.30 wt % of Ge.

Example C 13

This example illustrates the synthesis of the catalyst by sequentially loading the SM-MAO of Example C 2 and (n-BuCp)$_2$ZrCl$_2$ on silica ES 70 from Crosfield (dehydroxylated at 250° C. for 4 hours) chemically modified using methyltricholorogermane (MeGeCl$_3$).

The synthesis procedure essentially matches that of Example C 4. However, the used quantities of the modified support, toluene, SM-MAO, and (n-BuCp)$_2$ZrCl$_2$ differed. In this example, 2.9700 g of silica modified with methyltricholorogermane (MeGeCl$_3$) was reacted with 0.8730 g of SM-MAO (in 8.7 ml toluene) and 0.1188 g of (n-BuCp)$_2$ZrCl$_2$) (in 14.8 ml toluene). This catalyst was designated as Catalyst C 13. It was stored in an inert atmosphere glove box. The analysis of this catalyst showed a loading of 0.66 wt % of Zr, 6.90 wt % of Al and 4.00 wt % of Ge.

Example C 14

This example illustrates the synthesis of the catalyst by loading (n-BuCp)$_2$ZrCl$_2$ on silica ES 70 from Crosfield (dehydroxylated at 250° C. for 4 hours) chemically modified using methyltricholorogermane (MeGeCl$_3$). No MAO was used.

In this example, 2.5011 g of silica modified with methyltricholorogermane (MeGeCl$_3$) was reacted with 0.1000 g of (n-BuCp)$_2$ZrCl$_2$) (in 12.5 ml toluene). This catalyst was designated as Catalyst C 14. It was stored in an inert atmosphere glove box. The analysis of this catalyst showed a loading of 0.44 wt % of Zr and 0.22 wt % of Ge.

Examples on Ethylene Homo- and Copolymerization

Example P 1

This example illustrates the homopolymerization of ethylene using the Catalyst C 1, (Example C 1). Ethylene was polymerized using an olefin polymerization reactor system supplied by Imtech Systems, the Netherlands, equipped with a one liter Büchi glass reactor, a Haake F6/B5 oil bath circulator, and a computer-interfaced data acquisition and control system. The reactor has a mechanical stirrer and ports for feeding catalyst slurry and hydrogen.

The polymerization trial started with baking the reactor at 140° C. and nitrogen pressure purging. The solvent hexane was dried using Type 4A, 1/8 inch molecular sieve. The moisture content in hexane was determined by Karl Fischer titration (using KF Coulometer, Mettler DL37). The post-titration moisture content was found to be less than 5 ppm. About 500 ml of dried hexane was transferred to the reactor. The MAO cocatalyst (4.0 ml) (from Witco, Germany) was introduced into the reactor using a syringe. The mixture was stirred slowly and the temperature was maintained at about 35 to 40° C.

The desired amount of Catalyst C 1 (0.1490 g which equals 7.5 μmole Zr) was weighed in a glove box under argon atmosphere. Then it was slurried in 5 ml hexane in a Schlenk flask. The catalyst slurry fed the reactor through the catalyst transfer port. A cocatalyst to catalyst molar ratio of Al:Zr=1,000 was used. The stirring speed was set at 500 rpm. The temperature of the reactor was raised to 75° C. using the Haake F6 oil bath circulator. When the temperature of the reaction mixture reached 75° C., dry ethylene fed the reactor at 8.5 bar. The polymerization trial was continued for 60 min. The temperature of the reactor was controlled at 75±1° C. through the Haake oil bath circulator. Closing the ethylene flow to the reactor and venting off the remaining ethylene terminated the polymerization reaction.

The polyethylene yield was 13.0 g. The catalytic activity was found to be 201 kg PE/(mol Zr. hr. bar) and the productivity was 0.09 kg PE/(g catalyst. hr.). The polymer properties are as follows: material density<0.899 g/cm³, melting point=134.6° C., MFI=2.13 g/10 min (190° C., 21.6 kg), $M_w$=134,066 g/g mol, PDI=3.74.

Example P 2

Ethylene was polymerized as in Example P 1 by feeding 0.1070 g of Reference Catalyst C 2 (Example C 2). The polyethylene yield was 23.0 g. The catalytic activity was found to be 355 kg PE/(mol Zr. hr. bar) and the productivity was 0.22 kg PE/(g catalyst. hr.). The polymer properties are as follows: material density=0.930 g/cm³, melting point=134.6° C., MFI=4.22 g/10 min (190° C., 21.6 kg), $M_w$=131,408 g/g mol, PDI=2.69.

Example P 3

Ethylene was polymerized as in Example P 1 by feeding 0.0970 g of Catalyst C 3 (Example C 3). The polyethylene yield was 26.0 g. The catalytic activity was found to be 405 kg PE/(mol Zr. hr. bar) and the productivity was 0.27 kg PE/(g catalyst. h). The polymer properties are as follows: material density=0.952 g/cm³, melting point=133.5° C., MFI=4.07 g/10 min (190° C., 21.6 kg), $M_w$=139,757 g/g mol, PDI=2.83.

Example P 4

Ethylene was polymerized as in Example P 1 by feeding 0.1312 g of Catalyst C 4 (Example C 4). The polyethylene yield was 38.0 g. The catalytic activity was found to be 586 kg PE/(mol Zr. hr. bar) and the productivity was 0.29 kg PE/(g catalyst. hr.). The polymer properties are as follows: material density=0.934 g/cm³, melting point=133.7° C., MFI=10.19 g/10 min (190° C., 21.6 kg), $M_w$=117,408 g/g mol, PDI=4.45.

Example P 5

Ethylene was polymerized as in Example P 1 by feeding 0.4020 g of Catalyst C 5 (Example C 5). The polyethylene yield was 20.0 g. The catalytic activity was found to be 314 kg PE/(mol Zr. hr. bar) and the productivity was 0.05 kg PE/(g catalyst. hr.). The polymer properties are as follows: material density=0.959 g/cm³, melting point=132.9° C., MFI=4.24 g/10 min (190° C., 21.6 kg), $M_w$=104,095 g/g mol, PDI=3.46.

Example P 6

Ethylene was polymerized as in Example P 1 by feeding 0.1351 g of Catalyst C 6 (Example C 6). The polyethylene yield was 47.0 g. The catalytic activity was found to be 732 kg PE/(mol Zr. hr. bar) and the productivity was 0.35 kg PE/(g catalyst. hr.). The polymer properties are as follows: material density=0.952 g/cm³, melting point=133.2° C., MFI=3.38 g/10 min (190° C., 21.6 kg), $M_w$=124,419 g/g mol, PDI=3.08.

Example P 7

Ethylene was polymerized as in Example P 1 by feeding 0.0698 g of Catalyst C 7 (Example C 7). The polyethylene yield was 39.0 g. The catalytic activity was found to be 600 kg PE/(mol Zr. hr. bar) and the productivity was 0.56 kg PE/(g catalyst. hr.). The polymer properties are as follows: material density=0.927 g/cm³, melting point=134.0° C., $M_w$=190,123 g/g mol, PDI=2.51.

Example P 8

Ethylene was polymerized as in Example P 1 by feeding 0.0761 g of Catalyst C 8 (Example C 8). The polyethylene yield was 93.0 g. The catalytic activity was found to be 1458 kg PE/(mol Zr. hr. bar) and the productivity was 1.22 kg PE/(g catalyst. hr.). The polymer properties are as follows: material density=0.950 g/cm³, melting point=133.3° C., MFI=5.53 g/10 min (190° C., 21.6 kg), $M_w$=131,100 g/g mol, PDI=2.80.

Example P 9

Ethylene was polymerized as in Example P 1 by feeding 0.0820 g of Catalyst C 9 (Example C 9). The polyethylene yield was 52.0 g. The catalytic activity was found to be 810 kg PE/(mol Zr. hr. bar) and the productivity was 0.63 kg PE/(g catalyst. hr.). The polymer properties are as follows: material density=0.945 g/cm³, melting point=135.8° C., $M_w$=192,793 g/g mol, PDI=2.69.

Example P 10

Ethylene was polymerized as in Example P 1 by feeding 0.1070 g of Catalyst C 2 (Example C 2). However, hydrogen was introduced as follows just after the addition of the catalyst. The one liter Buchi reactor was connected with a 300 ml high-pressure stainless steel cylinder containing hydrogen at 30 psi. Hydrogen fed the reactor till the pressure in the cylinder decreased to 24 psi (ΔP=6 psi); then, ethylene flowed at a pressure of 8.5 bar.

The polyethylene yield was 6.2 g. The catalytic activity was found to be 93 kg PE/(mol Zr. hr. bar) and the productivity was 0.06 kg PE/(g catalyst. hr.). The polymer properties are as follows: material density<0.899 g/cm³, melting point=132.7° C., MFI=254.00 g/10 min (190° C., 21.6 kg), $M_w$=47,927 g/g mol, PDI=2.53.

Example P 11

Ethylene was polymerized as in Example P 10 by feeding 0.0990 g of Catalyst C 3 (Example C 3). The polyethylene yield was 20.0 g. The catalytic activity was found to be 302 kg PE/(mol Zr. hr. bar) and the productivity was 0.20 kg PE/(g catalyst. hr.). The polymer properties are as follows: material density=0.959 g/cm³, melting point=132.9° C., MFI=279.60 g/10 min (190° C., 21.6 kg), $M_w$=45,475 g/g mol, PDI=2.35.

Example P 12

Ethylene was polymerized as in Example P 10 by feeding 0.1300 g of Catalyst C 4. The polyethylene yield was 39.0 g. The catalytic activity was found to be 593 kg PE/(mol Zr. hr. bar) and the productivity was 0.30 kg PE/(g catalyst. hr.). The polymer properties are as follows: material density=0.950 g/cm³, melting point=133.3° C., MFI=116.70 g/10 min, $M_w$=63,174 g/g mol, PDI=2.44.

Example P 13

Ethylene was polymerized as in Example P 10 by feeding 0.4030 g of Catalyst C 5 (Example C 5). The polyethylene yield was 14.0 g. The catalytic activity was found to be 217 kg PE/(mol Zr. hr. bar) and the productivity was 0.04 kg PE/(g catalyst. hr.). The polymer properties are as follows: material density<0.899 g/cm³, melting point=132.6° C., MFI=109.20 g/10 min (190° C., 21.6 kg), $M_w$=43,463 g/g mol, PDI=2.62.

Example P 14

Ethylene was polymerized as in Example P 10 by feeding 0.1352 g of Catalyst C 6 (Example C 6). The polyethylene yield was 48.0 g. The catalytic activity was found to be 747 kg PE/(mol Zr. hr. bar) and the productivity was 0.36 kg PE/(g catalyst. hr.). The polymer properties are as follows: material density=0.952 g/cm$^3$, melting point=133.9° C., MFI=37.67 g/10 min (190° C., 21.6 kg), M$_w$=65,902 g/g mol, PDI=2.43.

Example P 15

Ethylene was copolymerized with 1-hexene following the Example of P 1. However, 25 ml 1-hexene was introduced just after feeding the hexane solvent; then, 4.0 ml MAO and 0.0690 g of Catalyst C 7 (Example C 7) were used.

The polyethylene yield was 33.0 g. The catalytic activity was found to be 513 kg PE/(mol Zr. hr. bar) and the productivity was 0.48 kg PE/(g catalyst. hr.). The polymer properties are as follows: material density=0.906 g/cm$^3$, melting point=121.8° C., MFI=3.93 g/10 min (190° C., 2.16 kg), M$_w$=71,385 g/g mol, PDI=2.72.

Example P 16

Ethylene was copolymerized with 1-hexene as in Example P 15. However, 0.0382 g of Catalyst C 8 (Example C 8) and an Al:Zr molar ratio of 2,000 were used.

The polyethylene yield was 34.0 g. The catalytic activity was found to be 1,026 kg PE/(mol Zr. hr. bar) and the productivity was 0.89 kg PE/(g catalyst. hr.). The polymer properties are as follows: material density=0.903 g/cm$^3$, melting point=122.5° C., MFI=12.40 g/10 min (190° C., 2.16 kg), M$_w$=51,007 g/g mol, PDI=2.63.

Example P 17

Ethylene was copolymerized with 1-hexene as in Example P 15. However, 18 ml 1-hexene, 0.0388 g of Catalyst C 8 (Example C 8), 2.0 ml MAO, and an Al:Zr molar ratio of 1,000 were used.

The polyethylene yield was 61.0 g. The catalytic activity was found to be 1,854 kg PE/(mol Zr. hr. bar) and the productivity was 1.57 kg PE/(g catalyst. hr.). The polymer properties are as follows: material density=0.936 g/cm$^3$, melting point=122.3° C., MFI=143.93 g/10 min (190° C., 21.6 kg), M$_w$=69,317 g/g mol, PDI=2.67.

Example P 18

In this example, ethylene was copolymerized with 1-hexene in a 3-liter reactor. After baking and purging the reactor with nitrogen, 1.5 liter of hexane was added to the reactor. Then 20 ml of 1-hexene and 5 ml of MMAO (from Akzo Nobel) were sequentially introduced to the reactor using an injection pump. Following this, the reactor was heated to 78° C. It was flushed with hydrogen; the hydrogen flow was stopped when the reactor total pressure reached 1.8 bar. The temperature of the reactor was raised to 85° C. and ethylene fed till the reactor total pressure attained 16 bar. The reactor was stirred at 375 rpm.

Catalyst C 8 (Example C 8) (0.1500 g) was slurried in hexane; then, it was fed into the reactor using an injection pump. The polymerization was conducted for 30 min. The Al:Zr molar ratio was about 625. Venting ethylene terminated the polymerization.

The polyethylene yield was 224.0 g. The catalytic activity was found to be 1,871 kg PE/(mol Zr. hr. bar) and the productivity was 3.00 kg PE/(g catalyst. hr.). The polymer properties are as follows: material density=0.9293 g/cm$^3$, melting point=132.0° C., MFI=57.30 g/10 min (190° C., 0.325 kg), M$_w$=26,899 g/g mol, PDI=2.74.

Example P 19

Ethylene was copolymerized with 1-hexene as in Example P 18; however, the amount of 1-hexene, MMAO, and catalyst added differed. Here, 10 ml of 1-hexene was added to hexane. Then, 3.9 ml of MMAO and 0.0750 g of Catalyst C 8 fed the reactor. The Al:Zr molar ratio was 975.

The polyethylene yield was 260.0 g. The catalytic activity was found to be 2,172 kg PE/(mol Zr. hr. bar) and the productivity was 3.47 kg PE/(g catalyst. hr.). The polymer properties are as follows: material density=0.921 g/cm$^3$, melting point=132.3° C., MFI=191.27 g/10 min, M$_w$=19,434 g/g mol, PDI=2.30.

Example P 20

Ethylene was polymerized as in Example P 1 by feeding 0.0911 g of Catalyst C 10 (Example C 10). The polyethylene yield was 108.0 g. The catalytic activity was found to be 3,517 kg PE/(mol Zr. hr. bar) and the productivity was 1.19 kg PE/(g catalyst. hr.). The polymer properties are as follows: material density=0.943 g/cm$^3$, melting point=135.4° C., M$_w$=241,558 g/g mol, PDI=2.44.

Example P 21

Ethylene was polymerized as in Example P 1 by feeding 0.0905 g of Catalyst C 10 (Example C 10). MMAO was used as the cocatalyst. The polyethylene yield was 91.0 g. The catalytic activity was found to be 2,893 kg PE/(mol Zr. hr. bar) and the productivity was 1.00 kg PE/(g catalyst. hr.). The polymer properties are as follows: material density= 0.939 g/cm$^3$, melting point=136.5° C., M$_w$=245,493 g/g mol, PDI=2.27.

Example P 22

Ethylene was polymerized as in Example P 1 by feeding 0.0502 g of Catalyst C 11 (Example C 11). The trial was conducted for 30 min. The polyethylene yield was 112.0 g. The catalytic activity was found to be 7,374 kg PE/(mol Zr. hr. bar) and the productivity was 4.46 kg PE/(g catalyst. hr.). The polymer properties are as follows: material density= 0.943 g/cm$^3$, melting point=136.6° C., M$_w$=136,348 g/g mol, PDI=2.05.

Example P 23

Ethylene was polymerized as in Example P 1 by feeding 0.0491 g of Catalyst C 11 (Example C 11). MMAO was used as the cocatalyst. The polyethylene yield was 92.0 g. The catalytic activity was found to be 2,914 kg PE/(mol Zr. hr. bar) and the productivity was 1.87 kg PE/(g catalyst. hr.). The polymer properties are as follows: material density= 0.942 g/cm$^3$, melting point=136.1° C., M$_w$=267,318 g/g mol, PDI=2.07.

Example P 24

Ethylene was copolymerized with 1-hexene as in Example P 15; however, the amount of 1-hexene, MMAO, and catalyst added differed. Here, 25 ml of 1-hexene was added to hexane. Then, 2.9 ml of MMAO and 0.0504 g of Catalyst C 11 (Example C 11) was fed to the reactor. The Al:Zr molar ratio was 1,000.

The polyethylene yield was 76.0 g. The catalytic activity was found to be 2,373 kg PE/(mol Zr. hr. bar) and the productivity was 1.51 kg PE/(g catalyst. hr.). The polymer properties are as follows: material density=0.911 g/cm$^3$, melting point=118.0° C., M$_w$=180,538 g/g mol, PDI=2.75.

Example P 25

Ethylene was polymerized as in Example P 1 by feeding 0.0610 g of Catalyst C 12 (Example C 12). The trial was conducted for 30 min. The polyethylene yield was 78.0 g. The catalytic activity was found to be 5,110 kg PE/(mol Zr. hr. bar) and the productivity was 2.56 kg PE/(g catalyst. hr.). The polymer properties are as follows: material density=0.935 g/cm$^3$, melting point=135.4° C., $M_w$=273,305 g/g mol, PDI=2.28.

Example P 26

Ethylene was polymerized as in Example P 1 by feeding 0.0514 g of Catalyst C 13 (Example C 13). The trial was conducted for 30 min. The polyethylene yield was 109.0 g. The catalytic activity was found to be 7,327 kg PE/(mol Zr. hr. bar) and the productivity was 4.24 kg PE/(g catalyst. hr.). The polymer properties are as follows: material density=0.936 g/cm$^3$, melting point=136.6° C., MFI=4.72 g/10 min (190° C., 21.6 kg), $M_w$=294,689 g/g mol, PDI=2.00.

ization was conducted for 1 hour. The stirrer speed was 375 rpm.

The polyethylene yield was 190.0 g. The catalytic activity was found to be 5,252 kg PE/(mol Zr. hr. bar) and the productivity was 4.75 kg PE/(g catalyst. hr.). The polymer properties are as follows: material density=0.922 g/cm$^3$, melting point=133.1° C., MFI=16.91 g/10 min (190° C., 2.16 kg), $M_w$=55,995 g/g mol, PDI=2.40.

Example P 28

Ethylene was polymerized as in Example P 1 by feeding 0.0159 g of Catalyst C 14. The polyethylene yield was 87.0 g. The catalytic activity was found to be 2,664 kg PE/(mol Zr. hr. bar) and the productivity was 1.09 kg PE/(g catalyst. hr.). The polymer properties are as follows: material density=0.942 g/cm$^3$, melting point=135.8° C., MFI=1.40 g/10 min (300° C., 21.6 kg), $M_w$=171,955 g/g mol, PDI=2.31.

TABLE 1

Summary of Catalyst Performance and Polymerization Results

| Catalyst example | Polymerization example | Yield (g) | Activity (kg PE/ (mol Zr h bar)) | Productivity (kg PE/ (g cat h)) | Density (g/cm$^3$) | Melting (° C.) | MFI (g/10 min) | Mw (g/g mol) | PDI |
|---|---|---|---|---|---|---|---|---|---|
| C 1  | P 1[a]   | 13.0  | 201   | 0.09 | <0.899 | 134.6 | 2.13[1]   | 134,066 | 3.74 |
| C 2  | P 2[a]   | 23.0  | 355   | 0.22 | 0.930  | 134.6 | 4.22[1]   | 131,408 | 2.69 |
| C 3  | P 3[a]   | 26.0  | 405   | 0.27 | 0.952  | 133.5 | 4.07[1]   | 139,757 | 2.83 |
| C 4  | P 4[a]   | 38.0  | 586   | 0.29 | 0.934  | 133.7 | 10.19[1]  | 117,408 | 4.45 |
| C 5  | P 5[a]   | 20.0  | 314   | 0.05 | 0.959  | 132.9 | 4.24[1]   | 104,095 | 3.46 |
| C 6  | P 6[a]   | 47.0  | 732   | 0.35 | 0.952  | 133.2 | 3.38[1]   | 124,419 | 3.08 |
| C 7  | P 7[a]   | 39.0  | 600   | 0.56 | 0.927  | 134.0 | 1.02[4]   | 190,123 | 2.51 |
| C 8  | P 8[a]   | 93.0  | 1,458 | 1.22 | 0.950  | 133.3 | 5.53[1]   | 131,100 | 2.80 |
| C 9  | P 9[a]   | 52.0  | 810   | 0.63 | 0.945  | 135.8 | 2.33[4]   | 192,793 | 2.69 |
| C 2  | P 10[b]  | 6.2   | 93    | 0.06 | <0.899 | 132.7 | 254.00[1] | 47,927  | 2.53 |
| C 3  | P 11[b]  | 20.0  | 302   | 0.20 | 0.959  | 132.9 | 279.60[1] | 45,475  | 2.35 |
| C 4  | P 12[b]  | 39.0  | 593   | 0.30 | 0.950  | 133.3 | 116.70[1] | 63,174  | 2.44 |
| C 5  | P 13[b]  | 14.0  | 217   | 0.04 | <0.899 | 132.6 | 109.20[1] | 43,463  | 2.62 |
| C 6  | P 14[b]  | 48.0  | 747   | 0.36 | 0.952  | 133.9 | 37.67[1]  | 65,902  | 2.43 |
| C 7  | P 15[c]  | 33.0  | 513   | 0.48 | 0.906  | 121.8 | 3.93[2]   | 71,385  | 2.72 |
| C 8  | P 16[c]  | 34.0  | 1,026 | 0.89 | 0.903  | 122.5 | 12.40[2]  | 51,007  | 2.63 |
| C 8  | P 17[c]  | 61.0  | 1,854 | 1.57 | 0.936  | 122.3 | 143.93[1] | 69,317  | 2.67 |
| C 8  | P 18[d]  | 224.0 | 1,871 | 3.00 | 0.929  | 132.0 | 57.30[2]  | 26,899  | 2.74 |
| C 8  | P 19[d]  | 260.0 | 2,172 | 3.47 | 0.921  | 132.3 | 191.27[3] | 19,434  | 2.30 |
| C 10 | P 20[a]  | 108.0 | 3,517 | 1.19 | 0.943  | 135.4 | 2.13[4]   | 241,558 | 2.44 |
| C 10 | P 21[a]  | 91.0  | 2,893 | 1.00 | 0.939  | 136.5 | 2.80[4]   | 245,493 | 2.27 |
| C 11 | P 22[a]  | 112.0 | 7,374 | 4.46 | 0.943  | 136.6 | 1.82[4]   | 136,348 | 2.05 |
| C 11 | P 23[a]  | 92.0  | 2,914 | 1.87 | 0.942  | 136.1 | 2.3[d]    | 267,318 | 2.07 |
| C 11 | P 24[c]  | 76.0  | 2,373 | 1.51 | 0.911  | 118.0 | 4.72[1]   | 180,538 | 2.75 |
| C 12 | *P 25[a] | 78.0  | 5,110 | 2.56 | 0.935  | 135.4 | 1.76[4]   | 273,305 | 2.28 |
| C 13 | P 26[a]  | 109.0 | 7,327 | 4.24 | 0.936  | 136.6 | 2.77[4]   | 294,689 | 2.00 |
| C 12 | **P 27[a]| 190.0 | 5,252 | 4.75 | 0.922  | 133.1 | 16.91[2]  | 55,995  | 2.40 |
| C 14 | P 28     | 87.0  | 2,664 | 1.09 | 0.942  | 135.8 | 1.40[4]   | 171,955 | 2.31 |

[a]Homopolymerization;
[b]Homopolymerization in presence of hydrogen;
[c]Copolymerization with 1-hexene;
[d]Copolymerization with 1-hexene in presence of hydrogen.
*Cocatalyst = MAO;
**Cocatalyst = MMAO.
[1]190° C., 21.6 kg;
[2]190° C., 2.16 kg;
[3]190° C., 0.325 kg;
[4]300° C. 21.6 kg.

Example P 27

Ethylene was homopolymerized following Example P 18; however, the amount of MMAO and catalyst added differed. Here, 2.5 ml of MMAO and 0.0400 g of Catalyst C 12 fed the reactor. The Al:Zr molar ratio was 1,983. The polymer- The foregoing description of the preferred embodiments of this invention has been presented for the purpose of illustration and description. Obvious modifications or variations are possible in the light of the above teachings. The embodiments were chosen and described to best illustrate the principles of this invention and its practical application to thereby enable those skilled in the art to utilize the invention in various embodiments and with various modifications as are suited to the particular cases contemplated.

What is claimed is:

1. A supported catalyst system comprising:
   (a) a support comprised of at least one inorganic oxide of the group consisting of Si, Al, Mg, Zr and Ti, or a polymeric support material having a reactive OH group, wherein said inorganic oxide or polymeric support material is chemically combined with an organogermane or an organotin compound, and
   (b) at least one metallocene; and at least one aluminoxane cocatalyst, wherein said aluminoxane has a linear, cyclic or cluster type structure.

2. The catalyst system of claim 1, wherein said support is an inorganic oxide of Si or Al and said metallocene is supported on said inorganic oxide.

3. The catalyst system of claim 1, wherein said metallocene has the formula:

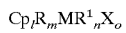

wherein Cp is an unsubstituted, substituted or fused cyclopentadienyl group, R is a group of 1–4 atoms connecting two Cp groups, M is a transition metal selected from Group IVB or Group VB of the periodic Table of the Elements, $R^1$ is a hydrocarbyl radical containing 1 to 20 carbon atoms, and X is a halogen or a hydrocarbyl group, wherein l=2–3, m=0 or 1, n=0–3, o=0–3, and the sum l+m+n+o equals the oxidation state of M.

4. The catalyst system of claim 1, wherein said support comprises silica, alumina, alumino-silicate or a poly (organosiloxane) microgel.

5. The catalyst system of claim 1, wherein the organogermane and organotin compound is selected from compounds having the following formulas:

(a)

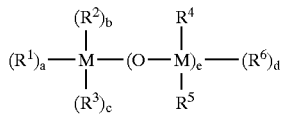

wherein $R^1$, $R^2$, $R^3$, $R^4$, $R^5$ & $R^6$ are identical or different and are each a $C_1$–$C_{30}$-group, a halogen atom, a hydroxyl group, or a hydrogen atom, and at least one of $R^1$, $R^2$, $R^3$, $R^4$, $R^5$ and $R^6$ is a radical comprising an -amino-, phosphino, thiol- or halogen containing group, and $R^1$, $R^2$, $R^3$, $R^4$, $R^5$ and $R^6$ can bridge two organo M units, and:
M=Ge or Sn
a, b, c, d are 0, 1, 2, 3 or 4,
a+b+c+d=4,
e=0–10; or $R^1_xA(OBR^2_y)_2$ (b)

wherein $R^1$ and $R^2$ are identical or different, and are each a $C_1$–$C_{20}$-group, a halogen atom, a hydroxyl group, or a hydrogen atom,
A is at least one element selected from the group consisting of Al, Ge, Zr, Sn and Hf,
B is at least one element selected from the group consisting of Si, Ge and Ti, and wherein A or B comprises Ge or Sn, and y=3,
x or z=0, 1, 2, 3 and 4,
x+z=4 for Ge, Zr, Sn and Hf, and
x+z=3 for Al.

6. The catalyst system of claim 1, wherein said support comprises an inorganic oxide of Si or Al, said metallocene is supported on said inorganic oxide, and said metallocene has the formula:

wherein Cp is an unsubstituted, substituted or fused cyclopentadienyl group, R is a group of 1–4 atoms connecting two Cp groups, M is a transition metal selected from Group IVB or Group VB of the periodic Table of the Elements, $R^1$ is a hydrocarbyl radical containing 1 to 20 carbon atoms, and X is a halogen or a hydrocarbyl group, wherein l=2–3, m 32 0 or 1, n=0–3, o=0–3, and the sum l+m+n+o equals the oxidation state of M.

7. The catalyst system of claim 1, wherein the organogermane or organotin compound is selected from the group consisting of methyltrichloro germane, butyltrichloro germane, allyl trichloro germane, tetrakis(siloxy)trimethyl germanium and butyltrichloro tin.

8. The catalyst system of claim 2, wherein the metallocene is selected from the group consisting of a zirconocene, hafnocene, and titanocene.

9. The catalyst system of of claim 1, wherein the metallocene comprises bis(cyclopentadienyl)zirconium dichloride, bis(n-butylcyclopentadienyl)zirconium dichloride, and bis(n-dodecylcyclopentadienyl)zirconium dichloride.

10. The catalyst system of claim 2, wherein the inorganic oxide support is dehydrated and dehydroxylated.

11. A supported catalyst system comprising:
   (a) a support comprised of at least one inorganic oxide of the group consisting of Si, Al, Mg, Zr and Ti, or a polymeric support material having a reactive OH group, wherein said inorganic oxide or polymeric support material is chemically combined with an organogermane or an organotin compound, and
   (b) at least one metallocene; and a cocatalyst comprised of MAO or Sm-MAO.

12. The catalyst system of claim 11, wherein said support is an inorganic oxide of Si or Al and said metallocene is supported on said inorganic oxide.

13. The catalyst system of claim 11, wherein said metallocene has the formula:

wherein Cp is an unsubstituted, substituted or fused cyclopentadienyl group, R is a group of 1–4 atoms connecting two Cp groups, M is a transition metal selected from Group IVB or Group VB of the periodic Table of the Elements, $R^1$ is a hydrocarbyl radical containing 1 to 20 carbon atoms, and X is a halogen or a hydrocarbyl group, wherein l=2–3, m=0 or 1, n=0–3, o=0–3, and the sum l+m+n+o equals the oxidation state of M.

14. The catalyst system of claim 11, wherein said support comprises silica, alumina, alumino-silicate or a poly (organosiloxane) microgel.

15. The catalyst system of claim 11, wherein the organogermane and organotin compound is selected from compounds having the following formulas:

(a)

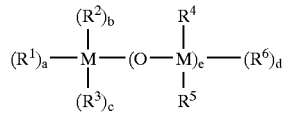

wherein $R^1$, $R^2$, $R^3$, $R^4$, $R^5$ & $R^6$ are identical or different and are each a $C_1$–$C_{30}$-group, a halogen atom, a hydroxyl group, or a hydrogen atom, and at least one of $R^1$, $R^2$, $R^3$, $R^4$, $R^5$ and $R^6$ is a radical comprising an -amino-, phosphino, thiol- or halogen containing group, and $R^1$, $R^2$, $R^3$, $R^4$, $R^5$ and $R^6$ can bridge two organo M units, and:

M=Ge or Sn
a, b, c, d are 0, 1, 2, 3 or 4,
a+b+c+d=4,
e=0–10; or $R^1_x A(OBR^2_y)_2$ (b)

wherein $R^1$ and $R^2$ are identical or different, and are each a $C_1$–$C_{20}$-group, a halogen atom, a hydroxyl group, or a hydrogen atom,
A is at least one element selected from the group consisting of Al, Ge, Zr, Sn and Hf,
B is at least one element selected from the group consisting of Si, Ge and Ti, and wherein A or B comprises Ge or Sn, and
y=3,
x or z=0, 1, 2, 3 and 4,
x+z=4 for Ge, Zr, Sn and Hf, and
x+z=3 for Al.

16. The catalyst system of claim 11, wherein said support comprises an inorganic oxide of Si or Al, said metallocene is supported on said inorganic oxide, and said metallocene has the formula:

$Cp_l R_m M R^1_n X_o$ wherein Cp is an unsubstituted, substituted or fused cyclopentadienyl group, R is a group of 1–4 atoms connecting two Cp groups, M is a transition metal selected from Group IVB or Group VB of the periodic Table of the Elements, $R^1$ is a hydrocarbyl radical containing 1 to 20 carbon atoms, and X is a halogen or a hydrocarbyl group, wherein l=2–3, m=0 or 1, n=0–3, o=0–3, and the sum l+m+n+o equals the oxidation state of M.

17. The catalyst system of claim 11, wherein the organogermane or organotin compound is selected from the group consisting of methyltrichloro germane, butyltrichloro germane, allyl trichloro germane, tetrakis(siloxy)trimethyl germanium and butyltrichloro tin.

18. The catalyst system of claim 15, wherein the metallocene is selected from the group consisting of a zirconocene, hafnocene, and titanocene.

19. The catalyst system of claim 15, wherein the metallocene comprises bis(cyclopentadienyl)zirconium dichloride, bis(n-butylcyclopentadienyl)zirconium dichloride, and bis(n-dodecylcyclopentadienyl)zirconium dichloride.

20. The catalyst system of claim 12, wherein the inorganic oxide support is dehydrated and dehydroxylated.

* * * * *